United States Patent
Zhang et al.

(10) Patent No.: US 12,155,537 B2
(45) Date of Patent: Nov. 26, 2024

(54) SYSTEM FOR TRANSLATION-BASED REAL-TIME INCONSISTENCY DETECTION IN NETWORK FUNCTIONS VIRTUALIZATION (NFV)

(71) Applicant: Telefonaktiebolaget LM Ericsson (publ), Stockholm (SE)

(72) Inventors: Mengyuan Zhang, Hong Kong (CN); Yosr Jarraya, Montreal (CA); Makan Pourzandi, Montreal (CA); Lingyu Wang, Montreal (CA); Mourad Debbabi, Dollard des Ormeaux (CA); Sudershan Lakshmanan Thirunavukkarasu, Basel (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/003,427

(22) PCT Filed: Jul. 9, 2021

(86) PCT No.: PCT/IB2021/056207
§ 371 (c)(1),
(2) Date: Dec. 27, 2022

(87) PCT Pub. No.: WO2022/009181
PCT Pub. Date: Jan. 13, 2022

(65) Prior Publication Data
US 2023/0239219 A1    Jul. 27, 2023

Related U.S. Application Data

(60) Provisional application No. 63/050,553, filed on Jul. 10, 2020.

(51) Int. Cl.
*H04L 41/40* (2022.01)
*H04L 41/14* (2022.01)
*H04L 41/16* (2022.01)

(52) U.S. Cl.
CPC ............ *H04L 41/40* (2022.05); *H04L 41/145* (2013.01); *H04L 41/16* (2013.01)

(58) Field of Classification Search
CPC ....... H04L 41/40; H04L 41/145; H04L 41/16; H04L 41/0866; H04L 41/0895; H04L 41/28
(Continued)

(56) References Cited

U.S. PATENT DOCUMENTS 9,853,914 B1 * 12/2017 Felstaine ............. H04L 43/0876
10,069,694 B1 * 9/2018 Schwartz ............ H04L 41/0866
(Continued)

OTHER PUBLICATIONS

International Search Report and Written Opinion dated Sep. 30, 2021 issued in PCT Application No. PCT/IB2021/056207, consisting of 16 pages.
(Continued)

*Primary Examiner* — Meng Vang
(74) *Attorney, Agent, or Firm* — Weisberg I.P. Law, P.A.

(57) ABSTRACT

A method, system and apparatus are disclosed. According to one or more embodiments, a detection node in communication with a network function virtualization, NFV, system operating a NFV stack that is logically separable into a plurality of levels including a first level and a second level is provided. The detection node includes processing circuitry configured to: translate an executed first level event sequence to at least one translated second level event sequence, and compare the at least one translated second level event sequence to an executed second level event sequence to at least in part detect inconsistencies between the at least one translated second level event sequence and
(Continued)

the executed second level event sequence where the executed second level event sequence and the executed first level event sequence being part of a multi-level sequence flow.

25 Claims, 15 Drawing Sheets

(58) Field of Classification Search
USPC ......................................................... 709/223
See application file for complete search history.

(56) References Cited

U.S. PATENT DOCUMENTS

| | | | |
|---|---|---|---|
| 10,917,352 B1* | 2/2021 | Hanes | H04L 69/16 |
| 11,057,274 B1* | 7/2021 | Kumar | H04L 41/122 |
| 2007/0192474 A1* | 8/2007 | Decasper | H04L 67/306 |
| | | | 709/223 |
| 2016/0112269 A1 | 4/2016 | Singh et al. | |
| 2018/0367391 A1 | 12/2018 | Harneja et al. | |
| 2019/0208404 A1* | 7/2019 | Georgiev | H04L 67/51 |
| 2019/0334781 A1* | 10/2019 | Caldwell | H04L 41/12 |

OTHER PUBLICATIONS

ETSI GR NFV-SEC 007 V1.1.1 (Oct. 2017) Network Functions Virtualisation (NFV); Trust; Report on Attestation Technologies and Practices for Secure Deployments, consisting of 32 pages.
Sudershan et al., "Modeling NFV Deployment to Identify the Cross-level Inconsistency Vulnerabilities"; 2019 IEEE International Conference on Cloud Computing Technology and Science (CloudCom), Dec. 11, 2019, consisting of 8 pages.
ETSI GS NFV-IFA 026 V3.2.1 (Jul. 2019) Network Functions Virtualisation (NFV) Release 3; Management and Orchestration; Architecture enhancement for Security Management Specification, consisting of 20 pages.
Pattaranantakul et al., "NFV Security Survey: From Use Case Driven Threat Analysis to State-of-the-Art Countermeasures"; IEEE Communications Surveys Tutorials, vol. 20, No. 4, Fourth Quarter 2018, consisting of 39 pages.
Shin et al., "Verification of NFV Services: Problem Statement and Architecture"; ICTC '15; Honolulu, Hawaii, 2015, consisting of 16 pages.
Flittner et al., "ChainGuard: Controller-independent Verification of Service Function Chaining in Cloud Computing"; 2017 IEEE Conference on Network Function Virtualization and Software Defined Networks (NFV-SDN), consisting of 7 pages.
Tschaen et al., "SFC-Checker: Checking the Correct Forwarding Behavior of Service Function Chaining"; 2016 IEEE Conference on Network Virtualization and Software Defined Networks (NFV-SDN), consisting of 7 pages.
Zhang et al., "Generic and Agile Service Function Chain Verification on Cloud"; 2017 IEEE; consisting of 10 pages.
Vaswani, et al., "Attention is all you Need; 31st Conference on Neural Information Processing Systems (NIPS 2017)", Long Beach, CA; Dec. 2017, consisting of 15 pages.
Brabra et al., "Model-Driven Orchestration for Cloud Resources"; 2019 IEEE 12 International Conference on Cloud Computing (CLOUD), consisting of 8 pages.
Anonymous, "Cisco Network Services Orchestrator for Network Functions Virtualization (NFV)" NFV Orchestration with Cisco Network Services Orchestrator; Mar. 20, 2017, consisting of 11 pages.

* cited by examiner

Example 1

2019-09-17 19:05:33.228 4702 DEBUG tacker.db.nfvo.vnffg_db [req-77432a7e-da13-4738-8abe-9b9e6183b7bd ...] chain: [{...}] `create_vnffg_pre` /usr/local/lib/python2.7/dist-packages/tacker/db/nfvo/vnffg_db.py:423

2019-09-17 19:05:33.235 4702 DEBUG tacker.db.nfvo.vnffg_db [req-77432a7e-da13-4738-8abe-9b9e6183b7bd ...] vnffg_db <tacker.db.nfvo.vnffg_db.Vnffg[object at 7f25558baf90] {...}> `make_vnffg_dict` /usr/local/lib/python2.7/dist-packages/tacker/db/nfvo/vnffg_db.py:852
2019-09-17 19:05:33.244 4702 DEBUG tacker.db.nfvo.vnffg_db [req-77432a7e-da13-4738-8abe-9b9e6183b7bd ...] nfp_db <tacker.db.nfvo.vnffg_db.VnffgNfp[object at 7f25559c1b10] {...}> `make_nfp_dict` /usr/local/lib/python2.7/dist-packages/tacker/db/nfvo/vnffg_db.py:1378
2019-09-17 19:05:33.254 4702 DEBUG tacker.db.nfvo.vnffg_db [req-77432a7e-da13-4738-8abe-9b9e6183b7bd ...] chain_db <tacker.db.nfvo.vnffg_db.VnffgChain[object at 7f25559296901 {...}> `make_chain_dict` /usr/local/lib/python2.7/dist-packages/tacker/db/nfvo/vnffg_db.py:1388
2019-09-17 19:05:33.258 4702 DEBUG tacker.db.nfvo.vnffg_db [req-77432a7e-da13-4738-8abe-9b9e6183b7bd ...] classifier_db <tacker.db.nfvo.vnffg_db.VnffgClassifier[object at 7f2555929f50] {...}> `make_classifier_dict` /usr/local/lib/python2.7/dist-packages/tacker/db/nfvo/vnffg_db.py:1367

2019-09-17 19:05:33.289 4702 DEBUG tacker.nfvo.drivers.vim.openstack_driver [req-77432a7e-da13-4738-8abe-9b9e6183b7bd ...] fc passed is {...} `create_flow_classifier` /usr/local/lib/python2.7/dist-packages/tacker/nfvo/drivers/vim/openstack_driver.py:379

FIG. 9

In [127]: output = predict('createflow_classifiers createport_pairs createport_pair_groups createport_pairs creat Other Services: createflow_classifiers createport_pairs createport_pair_groups createport_pairs createport_pair_groups createport_pairs createport_pair_groups createport_chains
Tacker Sequence: createvnffgpre getvnfmapping makevnfdict validatevim buildvimauth findvimkey makevnf dict createvnffgpre makevnffgdict makevnfdict makechainedict makeclassifierdict makevnfdict t buildvimauth findvimkey createvnffgpost In [126]: ck validatingnovaflavor validatingport validatingserver creatingnovaflavor creatingserver'

Other Services: creatingstack validatingport validatingserver creatingnovaflavor creatingport creat ingnovaflavor creatingserver
Tacker Sequence: makevnfdict makevnfdict makevnfdict parsetemplateinput buildvimauth findvimkey creat evnfpre makevnfdict makevnfdict makevnfdict createvnf getvnfd createstack createstack mak evnfdict findmgmtips createvnfpost

FIG. 14

SYSTEM FOR TRANSLATION-BASED REAL-TIME INCONSISTENCY DETECTION IN NETWORK FUNCTIONS VIRTUALIZATION (NFV)

CROSS-REFERENCE TO RELATED APPLICATIONS

This application is a Submission Under 35 U.S.C. § 371 for U.S. National Stage Patent Application of International Application No .: PCT/IB2021/056207, filed Jul. 9, 2021 entitled "A SYSTEM FOR TRANSLATION-BASED REAL-TIME INCONSISTENCY DETECTION IN NETWORK FUNCTIONS VIRTUALIZATION (NFV)," which claims priority to U.S. Provisional Application No.: 63/050, 553, filed Jul. 1, 2020, entitled "A SYSTEM FOR TRANSLATION-BASED REAL-TIME INCONSISTENCY DETECTION IN NETWORK FUNCTIONS VIRTUALIZATION (NFV)," the entireties of both of which are incorporated herein by reference.

TECHNICAL FIELD

The present disclosure relates to wireless communications, and in particular, to translation of network function virtualization (NFV) events across different levels of a NFV stack where the translation may be used for a variety of functions and processes.

BACKGROUND

Network Functions Virtualization (NFV) is being adopted by the telecommunication industry as one of the technology pillars of $5^{th}$ Generation (5G, also referred to as New Radio (NR)). The deployment of a NFV stack often integrates various computing and networking virtualization technologies including software defined networking (SDN). Inconsistencies in network functions deployments can occur between several levels of the NFV stack due to the lack of proper synchronization between management and orchestration components, which may be referred to as the "split-brain". Thus, inconsistencies in an NFV stack have been recognized as an intrinsic security threat, since they can be exploited by malicious adversaries for security attack.

FIG. 1 is a diagram of an example of an inconsistency scenario in a European Telecommunications Standards Institute (ETSI) NFV Architecture in which only two virtual network functions (VNFs) are implemented in a Network Service (NS) instance at the VNF layer instead of three as requested by the corresponding NS specification at the orchestration layer.

The inconsistency threat has received attention in existing studies and has been acknowledged in ETSI NFV standardizations. However, the existing security verification solutions for NFV only considers the verification between Service Function Chains (SFC) and its specifications. In particular, most of the existing solutions that tackle the verification of network services deployed in NFV-environment propose a white-box state-based approach. These solutions assume access to all data in the management and network orchestration (MANO) databases (flow rules, flow classifier, etc.), which is not always the case. These solutions focus solely on verifying the functionality (e.g., the forwarding behavior) of service function chains (SFCs). More specifically, flow rules are gathered from virtual switches, then those tools simply perform verifications between flow rules and user specifications.

Even though verification-based solutions have been proposed to verify inconsistencies, these solutions are usually performed after the fact, i.e., there exists a delay between the time of attack and the time of verification.

One solution has been proposed for a multilevel NFV deployment model as shown in FIG. 2. This model captures the NFV deployment aspects at different deployment levels, which provides a base to perform in-depth study of the inconsistencies between such levels, i.e., Level 1 (L1): Service Orchestration, Level 2 (L2): Resource Management, Level 3 (L3): Virtualization, Level 4 (L4): Physical.

However, none of the existing solutions consider the implication of multiple abstraction levels in the NFV stack while designing their approach. The existing works ignore the challenges that are introduced by the multi-level nature of the NFV stack implementation, such as, feasibility of data collection, correlating data across the different levels and real-time detection. Further, the verification of the implementation of NS instances has not been investigated in existing works.

SUMMARY

Some embodiments advantageously provide methods, systems, and apparatuses for translation of network function virtualization (NFV) events across different levels of a NFV stack where the translation may be used for a variety of functions and processes.

One or more embodiments described herein provide a machine learning (ML)-based inconsistency detection system that translates NFV management events across different levels of the NFV stack. More specifically, once a tenant requests an operation, e.g., create VNF (an operation to create a virtual network function), to the Network Function Virtualization Orchestration (NFVO), a set of corresponding events may be generated in L1: Service Orchestration (Tacker) to verify existing implementation references in virtual network function manager (VNFM) for resource allocation. Then, a set of events may be generated in L2: Resource Management (Heat) to implement the corresponding operation request from the end user. Inconsistencies could be created between the NFV operation and management level. To at least help ensure the consistency of the NFV stack, one or more embodiments described herein first deploys the state-of-the-art Transformer-based machine translation, to translate the lower implementation events (e.g., Heat events) back to higher operational events (e.g., Tacker events). Then, the translated events and the original events sets are fed to a Siamese model (a state-of-the-art recursive neural network model) to detect any discrepancies between those two inputs.

One or more embodiments of the disclosure may provide one or more of the following advantages:

Defining and enabling a possible way for users/entities to detect inconsistencies in their multilevel NFV deployment (e.g., whether the request from a tenant is properly deployed).

Helping ensure the tenants of the correctness of their network services deployment.

The required inputs for one or more embodiments may only be the service logs, which are easily accessible by regular monitoring tools, e.g., security information and event management (SIEM).

More specifically, one or more embodiments described herein use pairwise sequences to train an NLP model to translate events sequences between the multiple levels of an NFV stack. This may be performed by the state-of-the-art machine learning model referred to as the Transformer.

Enabling the machine learning model to be applied on NFV context, which at least helps solve the challenges related to applying NLP translation into NFV context for security purpose.

Providing three levels of inconsistencies detection, which covers a wide range of detection.

The translation of events sequences also helps at least solve the privacy and trust issues between levels that are possibly operated by various vendors in an NFV environment.

According to one aspect of the disclosure, a detection node in communication with a network function virtualization, NFV, system operating a NFV stack that is logically separable into a plurality of levels including a first level and a second level is provided. The detection node includes processing circuitry configured to: translate an executed first level event sequence to at least one translated second level event sequence; and compare the at least one translated second level event sequence to an executed second level event sequence to at least in part detect inconsistencies between the at least one translated second level event sequence and the executed second level event sequence where the executed second level event sequence and the executed first level event sequence are part of a multi-level sequence flow.

According to one or more embodiments of this aspect, the at least one translated second level event sequence corresponds to a plurality of translated second level event sequences that are different from each other. According to one or more embodiments of this aspect, the translation of the executed first level event sequence to the at least one translated second level event sequence is based on a trained machine learning model. According to one or more embodiments of this aspect, the machine learning model is trained to using different event sequences from a same level where a first subset of the different event sequences representing a same resulting operation, and where a second subset of the different event sequences representing different resulting operations.

According to one or more embodiments of this aspect, the machine learning model is trained to learn different versions of event sequences that represent a same resulting operation. According to one or more embodiments of this aspect, the machine learning model is trained to consider uncertainty between different event sequences that represent a same resulting operation. According to one or more embodiments of this aspect, the comparing includes determining a similarity score and quantify inconsistencies between the at least one translated second level event sequence to the executed second level event sequence. The processing circuitry is further configured to trigger an alert if the similarity score meets a predefined criterion.

According to one or more embodiments of this aspect, the comparing includes determining whether there are differences between a Topology and Orchestration Specification for Cloud Applications, TOSCA, template associated with an end user and a TOSCA template associated with the translated second level event sequence. According to one or more embodiments of this aspect, the processing circuitry is further configured to: receive at least one service log associated with services performed by the NFV stack; extract parameters from the at least one service log; and extract the executed first level event sequence based at least on the extracted parameters. According to one or more embodiments of this aspect, the executed first level event sequence includes at least one system-initiated event and at least one user event.

According to one or more embodiments of this aspect, each translated second level event sequence corresponds to a different implementation of the executed first level event sequence. According to one or more embodiments of this aspect, the plurality of levels are a plurality of virtualization levels for the NFV stack. According to one or more embodiments of this aspect, the plurality of levels includes at least two of a service orchestration level, resource management level, virtual infrastructure level and a physical infrastructure level.

According to another aspect of the disclosure, a method implemented by a detection node in communication with a network function virtualization, NFV, system operating a NFV stack that is logically separable into a plurality of levels including a first level and a second level is provided. According to the method, an executed first level event sequence is translated to at least one translated second level event sequence, and the at least one translated second level event sequence is compared to an executed second level event sequence to at least in part detect inconsistencies between the at least one translated second level event sequence and the executed second level event sequence where the executed second level event sequence and the executed first level event sequence are part of a multi-level sequence flow.

According to one or more embodiments of this aspect, the at least one translated second level event sequence corresponds to a plurality of translated second level event sequences that are different from each other. According to one or more embodiments of this aspect, the translation of the executed first level event sequence to the at least one translated second level event sequence is based on a trained machine learning model. According to one or more embodiments of this aspect, the machine learning model is trained to using different event sequences from a same level, a first subset of the different event sequences representing a same resulting operation, a second subset of the different event sequences representing different resulting operations.

According to one or more embodiments of this aspect, the machine learning model is trained to learn different versions of event sequences that represent a same resulting operation. According to one or more embodiments of this aspect, the machine learning model is trained to consider uncertainty between different event sequences that represent a same resulting operation. According to one or more embodiments of this aspect, the comparing includes determining a similarity score and quantify inconsistencies between the at least one translated second level event sequence to the executed second level event sequence, and an alert is triggered if the similarity score meets a predefined criterion.

According to one or more embodiments of this aspect, the comparing includes determining whether there are differences between a Topology and Orchestration Specification for Cloud Applications, TOSCA, template associated with an end user and a TOSCA template associated with the translated second level event sequence. According to one or more embodiments of this aspect, receiving at least one service log associated with services performed by the NFV stack is received, parameters are extracted from the at least one service log, and the executed first level event sequence is extracted based at least on the extracted parameters. According to one or more embodiments of this aspect, the executed first level event sequence includes at least one system-initiated event and at least one user event.

According to one or more embodiments of this aspect, each translated second level event sequence corresponds to a different implementation of the executed first level event sequence. According to one or more embodiments of this aspect, the plurality of levels are a plurality of virtualization levels for the NFV stack. According to one or more embodiments of this aspect, the plurality of levels includes at least two of a service orchestration level, resource management level, virtual infrastructure level and a physical infrastructure level.

According to another aspect of the disclosure, a computer readable medium including processing instructions is provided. When the processing instructions are executed by a processor, the processor is caused to translate an executed first level event sequence to at least one translated second level event sequence where the first level event sequence and second level event sequence are part of a network function virtualization, NFV, stack that is logically separable into a plurality of levels, and compare the at least one translated second level event sequence to an executed second level event sequence to at least in part detect inconsistencies between the at least one translated second level event sequence and the executed second level event sequence where the executed second level event sequence and the executed first level event sequence being part of a multi-level sequence flow.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is an example of raw logs from tacker service according to some embodiments of the present disclosure;

FIG. 14 is a diagram of sample translation results from the transformer according to some embodiments of the present disclosure;

DETAILED DESCRIPTION

Figure 1:
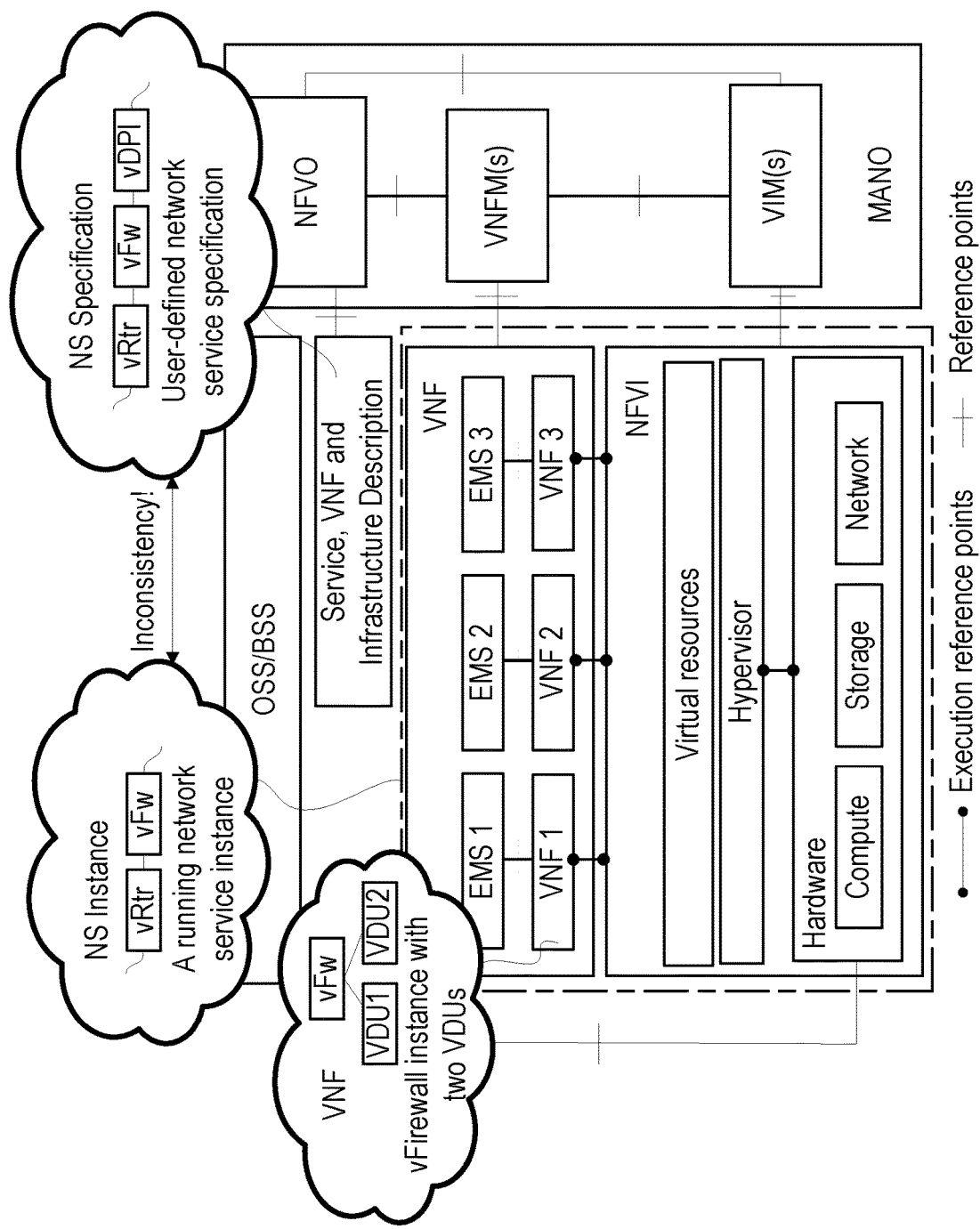
FIG. 1 is a diagram of an example of an inconsistency in a ETSI NFV architecture.
Figure 2:
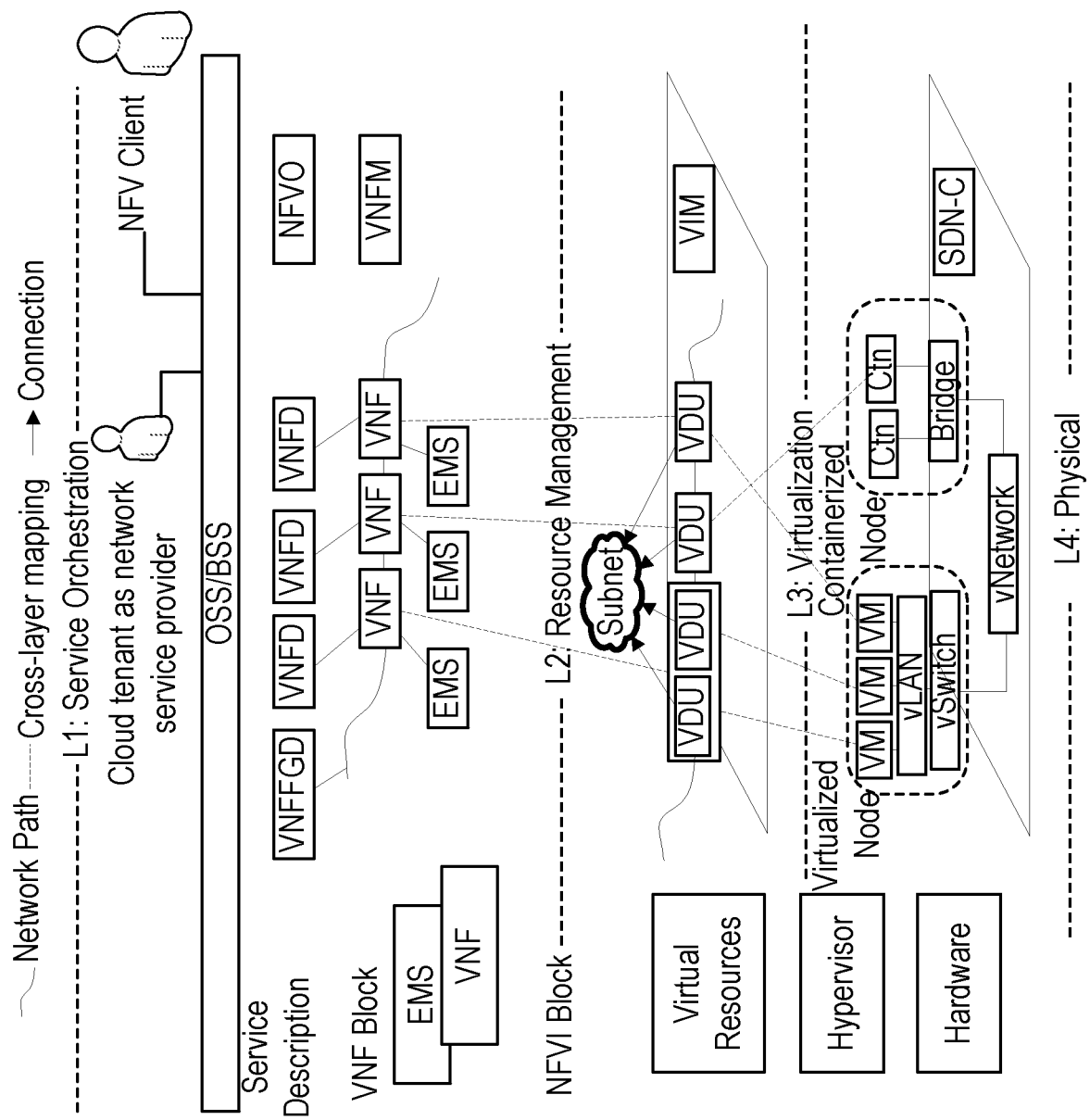
FIG. 2 is a diagram of a multilevel NFV deployment model.

One or more embodiments described herein describe a real-time approach for detecting inconsistencies in real-time in NFV. Further, one or more embodiments described herein translate NFV events between various deployment layers for real-time inconsistency detection.

Before describing in detail exemplary embodiments, it is noted that the embodiments reside primarily in combinations of apparatus components and processing steps related to translation of network function virtualization (NFV) events across different levels of a NFV stack where the translation may be used for a variety of functions and processes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As may be used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments, "sequence" may refer to an event sequence that may correspond to an original event sequence (i.e., untranslated event sequence) or a translated event sequence.

In some embodiments, "events" may refer to one or more event sequences.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide translation of network function virtualization (NFV) events across different levels of a NFV stack where the translation may be used for a variety of functions and processes.

Figure 3:
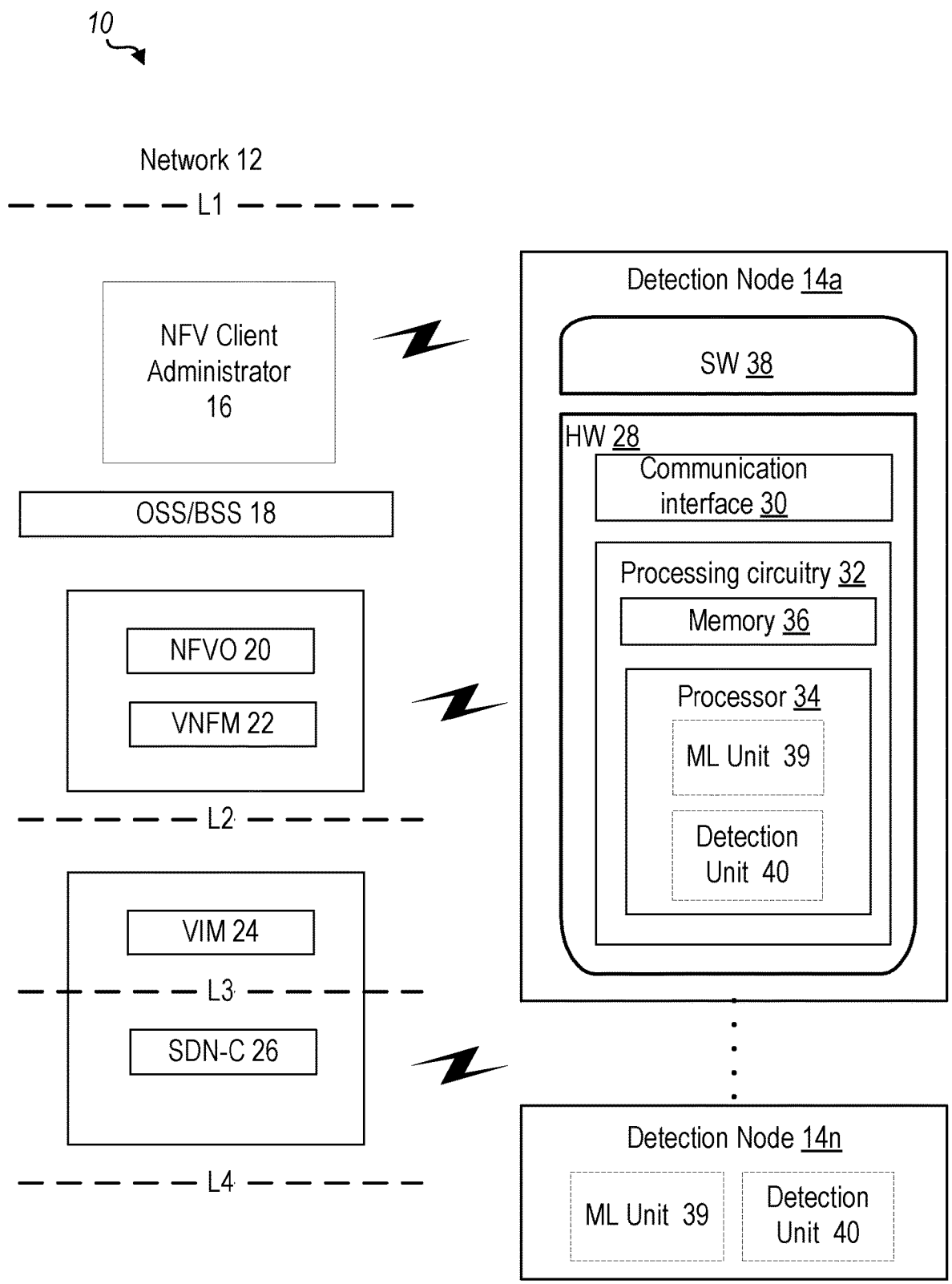
FIG. 3 is a diagram of an example network architecture according to the principles in the present disclosure.

Referring again to the drawing figures, in which like elements are referred to by like reference numerals, there is shown in FIG. 3 a block diagram of an example system 10, according to an embodiment, which includes network 12 in communication with one or more detection nodes 14a-14n (collectively referred to as detection node 14). Network 12 includes, within layer 1 (L1—service orchestration layer), NFV client administrator 16 and operation support systems (OSS)/business support systems (BSS) 18, both of which are well-known entities. Further, also within L1 is NFV orchestrator (NFVO) 20 and VNF manager (VNFM) 22. Layer 2 (L2) includes virtualized infrastructure manager (VIM) 24 while Layer 3 (L3) includes software defined network controller (SDN-C) 26, where these layers may be part of a NFV stack. While the functionality of elements 16-26 for various layers may be known, one or more of these elements may be modified to provide detection node 14 with one or more inputs (e.g., service logs, TOSCA description of NS, etc.) from the NFV stack as described herein. Further, other elements in one or more layers in network 12 are omitted for clarity but may be modified provide one or more inputs from the NFV stack.

Detection node 14 include hardware 28 enabling it to communicate with network 12 such as with one or more elements in one or more layers of network 12. In the embodiment shown, the hardware 28 of the detection node 14 further includes processing circuitry 32. The processing circuitry 32 may include a processor 34 and a memory 36. In particular, in addition to or instead of a processor, such as a central processing unit, and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the detection node 14 further has software 38 stored internally in, for example, memory 36, or stored in external memory (e.g., database, storage array, network storage device, etc.) accessible by the detection node 14. The software 38 may be executable by the processing circuitry 32. The processing circuitry 32 may be configured to control any of the methods and/or processes described herein and/or to cause such methods, and/or processes to be performed, e.g., by detection node 14. Processor 34 corresponds to one or more processors 34 for performing detection node 14 functions described herein. The memory 36 is configured to store data, programmatic software code and/or other information described herein. In some embodiments, the software 38 may include instructions that, when executed by the processor 34 and/or processing circuitry 32, causes the processor 34 and/or processing circuitry 32 to perform the processes described herein with respect to detection node 14. For example, processing circuitry 32 of the detection node 14 may include machine learning (ML) unit 39 (also referred to as deep learning based translation module) configured to perform one or more detection nodes 14 functions as described herein such as with respect to translation of NFV events across different levels of a NFV stack. In one or more embodiments, ML unit 39 may be configured to learn pairwise event sequences from NFV, as described herein.

For example, processing circuitry 32 of the detection node 14 may include detection unit 40 (also referred to as neural network-based inconsistency detection module) configured to perform one or more detection nodes 14 functions as described herein such as with respect to translation of NFV events across different levels of a NFV stack. In one or more embodiments, detection unit 40 is configured to detect inconsistencies between at least one NFV event sequence and at least one translated NFV event sequence such as by using a calculated similarity score, as described herein. Alternatively, functions of ML unit 39 and detection unit 40 may be provided by a single unit.

In some embodiments, the inner workings of the detection node 14 may be as shown in FIG. 3, or alternatively, one or more functions and/or components of detection node 14 may be included as part of network 12 and/or other entity in network 12 and/or as part of another detection node 14 such that one or more functions may be performed by a first detection node 14 while other functions may be performed by a second detection node 14. Further, although FIG. 3 shows detection unit 40 and ML unit 39 as being within a respective processor, it is contemplated that this may be implemented such that a portion of the unit is stored in a corresponding memory within the processing circuitry. In other words, the unit may be implemented in hardware or in a combination of hardware and software within the processing circuitry.

Figure 4:
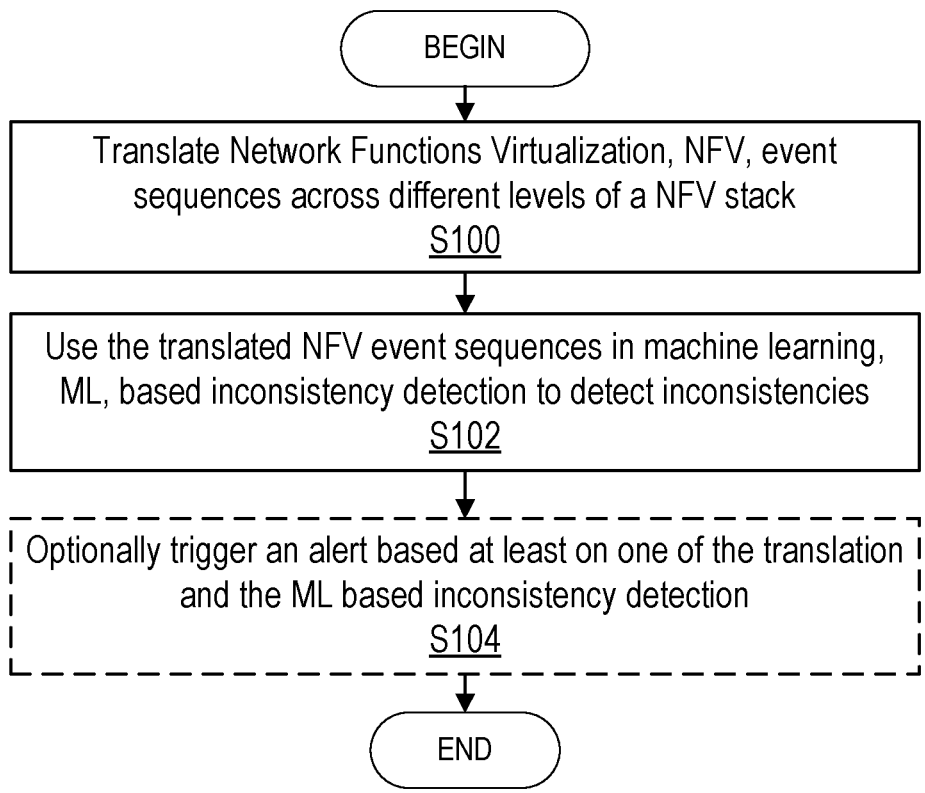
FIG. 4 is a flowchart of an example process in a detection node according to some embodiments of the present disclosure.

FIG. 4 is a flowchart of an example process in system 10 according to some embodiments of the present disclosure. In particular, the process of FIG. 4 is described from the perspective of detection node 14 although other configurations are contemplated, some of which are described herein. One or more Blocks and/or functions performed by detection node 14 may be performed by one or more elements of detection node 14 such as by ML unit 39 and/or detection unit 40 in processing circuitry 32, processor 34, communication interface 30, etc. In one or more embodiments, detection node 14 is configured to translate (Block S100) Network Functions Virtualization, NFV, events across different levels of a NFV stack, as described herein. In one or more embodiments, detection node 14 is configured to use (Block S102) the translated NFV event sequences in machine learning, ML, based inconsistency detection to detect inconsistencies, as described herein. In one or more embodiments, detection node 14 is configured to optionally trigger (Block S104) an alert based at least on one of the translation and the ML based inconsistency detection. In one or more embodiments, one or more of Blocks S100-S104 may be performed by a different detection node 14 such that the process of FIG. 4 may be performed by a plurality of detection nodes 14.

According to one or more embodiments, the translation includes translating NFV event sequences from a first level to operational events at a second level where the second level is different from the first level. For example, the NFV event sequences may be translated between two abstraction levels that could be from an upper level to a lower level or from a lower level to an upper level. According to one or more embodiments, the translation is a deep learning-based translation, and the triggering of the alert is based on at least one translation and one NFV even sequence to be verified. According to one or more embodiments, the translation is performed by a deep learning based translation module to learn pairwise event sequences from NFV, and the detection of inconsistencies is performed by a neural network-based inconsistency detection module.

According to one or more embodiments, the neural network is a Siamese neural network. According to one or more embodiments, the detection of inconsistences further includes calculating a similarity score based at least on at least one of the NFV event sequences and at least one of the translated NFV event sequences, and the triggering of the alert is based on the calculated similarity score. According to one or more embodiments, the system is further configured to search for inconsistencies in the translation among corresponding NFV event sequences, at the different levels, that are associated with a requested operation, and the trigger is based at least on the search. In one or more embodiments, while the translation is described as translating NFV event sequences, the translating may occur at the event level such that one or more events are translated individually or without respect to the event sequences.

Figure 5:
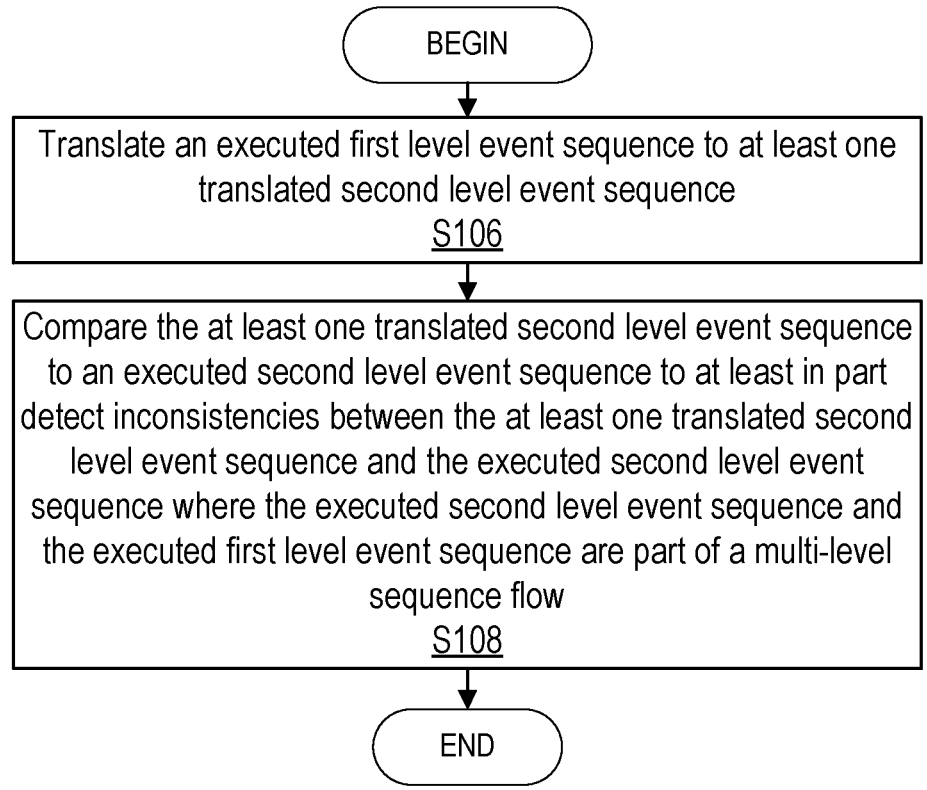
FIG. 5 is a flowchart of another example process in a detection node according to some embodiments of the present disclosure.

FIG. 5 is a flowchart of another example process in system 10 according to some embodiments of the present disclosure. In particular, the process of FIG. 5 is described from the perspective of detection node 14 although other configurations are contemplated, some of which are described herein. One or more Blocks and/or functions performed by detection node 14 may be performed by one or more elements of detection node 14 such as by ML unit 39 and/or detection unit 40 in processing circuitry 32, processor 34, communication interface 30, etc. In particular, a detection node 14 is in communication with a network function virtualization, NFV, system operating a NFV stack that is logically separable into a plurality of levels including a first level and a second level. Detection node 14 is configured to translate (Block S106) an executed first level event sequence to at least one translated second level event sequence, as described herein. Detection node 14 is configured to compare (Block S108) the at least one translated second level event sequence to an executed second level event sequence to at least in part detect inconsistencies between the at least one translated second level event sequence and the executed second level event sequence where the executed second level event sequence and the executed first level event sequence are part of a multi-level sequence flow, as described herein.

According to one or more embodiments, the at least one translated second level event sequence corresponds to a plurality of translated second level event sequences that are different from each other. According to one or more embodiments, the translation of the executed first level event sequence to the at least one translated second level event sequence is based on a trained machine learning model. In particular, in one or more examples, the sequences at different levels are semantically related. For example, VNNFG creation at level 1 leads to events which are semantically related to the creation of VNFFG event at the higher level such that these events are not any events at the two levels but events at the lower level that come from the events at the higher level.

According to one or more embodiments, the machine learning model is trained to using different event sequences from a same level where a first subset of the different event sequences represent a same resulting operation, and where a second subset of the different event sequences represent different resulting operations.

According to one or more embodiments, the machine learning model is trained to learn different versions of event sequences that represent a same resulting operation. According to one or more embodiments, the machine learning model is trained to consider uncertainty between different event sequences that represent a same resulting operation. According to one or more embodiments, the comparing includes determining a similarity score and quantify inconsistencies between the at least one translated second level event sequence to the executed second level event sequence. The processing circuitry 32 is further configured to trigger an alert if the similarity score meets a predefined criterion.

According to one or more embodiments, the comparing includes determining whether there are differences between a Topology and Orchestration Specification for Cloud Applications, TOSCA, template associated with an end user and a TOSCA template associated with the translated second level event sequence. According to one or more embodiments, the processing circuitry is further configured to receive at least one service log associated with services performed by the NFV stack, extract parameters from the at least one service log, and extract the executed first level event sequence based at least on the extracted parameters. According to one or more embodiments, the executed first level event sequence includes at least one system-initiated event and at least one user event.

According to one or more embodiments, each translated second level event sequence corresponds to a different implementation of the executed first level event sequence. According to one or more embodiments, the plurality of levels are a plurality of virtualization levels for the NFV stack. According to one or more embodiments, the plurality of levels includes at least two of a service orchestration level, resource management level, virtual infrastructure level and a physical infrastructure level.

In one or more embodiments, a first detection node 14 may perform deep learning based translation to learn sequence of events from NFV where the translated sequences are then sent to another detection node 14 for performing neural network (NN)-based inconsistency detection to detect inconsistencies. For example, the translated sequence(s) (i.e., NFV event sequence) may be sent to a second detection node 14 for Siamese network-based inconsistency detection. The Siamese network-based inconsistency detection may include inputting the original (i.e., untranslated) NFV sequence(s) and the translated NFV sequence(s) and calculating a similarity score based on these two inputs. A low similarity score (i.e., a score below a threshold) may indicate inconsistency between a user's operation and real implementation in system 10. The Siamese network-based inconsistency detection may be one of other ML methods may be used in accordance with the teachings described herein that may be used to extract the similarities between the original NFV sequences and translated NFV sequences to detection deviation from consistent implementations. The deep learning based translation may learn pairwise event sequences from NFV.

Having generally described arrangements for translation of NFV events across different levels of a NFV stack where the translation may be used for a variety of functions and processes as follows, and which may be implemented by the detection node(s) 14. In particular, the sequence of NFV events at each level of the NFV stack has a semantic context. For example, a VDU defined in a Tacker level would lead at deployment time to a set of VMs to be created at the VIM level. This latter property is used to consider the sequence of events as a sequence of words with semantic context. The sequence of events from multiple NFV services from different levels working together towards performing a high-level operation (e.g., instantiate VNFFG) may be considered a conversation taking place between multiple parties such that language translation techniques used to study human conversations are modified and applied to the sequence of NFV events for translating NFV event sequences involving different NFV services on different levels. That is, as there a different ways in which a German language phrase can be translated to another language, there may be multiple ways a higher level operation can be implemented at the lower level. Hence, as language translation can be used to detect inconsistencies in conversation, one or more embodiments described herein are able to perform cross-level inconsistency detection in NFV event sequences using modified translation methods.

Embodiments provide translation of NFV events across different levels of a NFV stack where the translation may be used for a variety of functions and processes such as triggering an alert indicating detection of an inconsistency as described herein. One or more functions described below may be performed by one or more of processing circuitry 32, processor 34, detection unit 40, ML unit 39, etc.

System Overview

Figure 6:
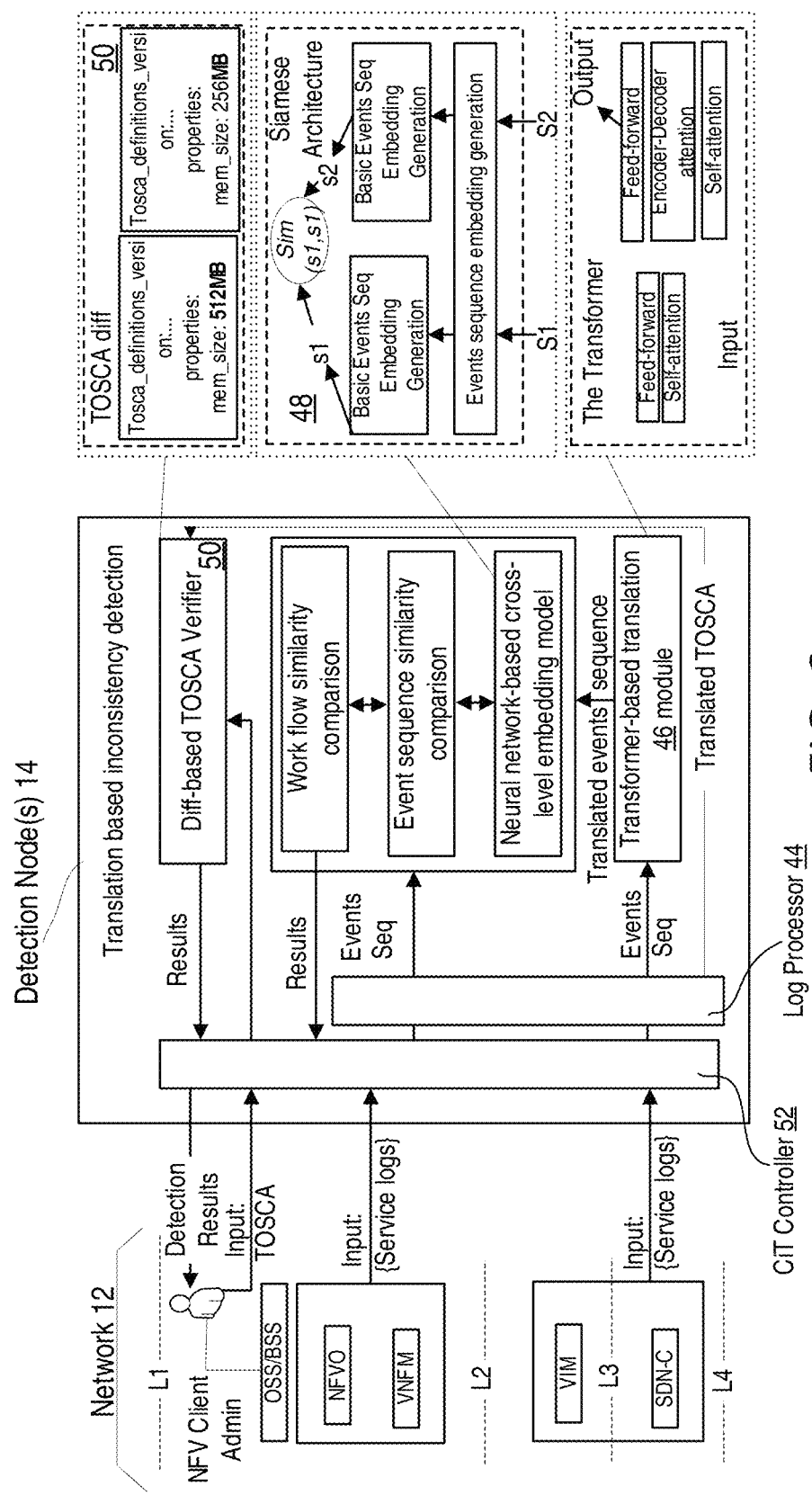
FIG. 6 is a diagram of an example system architecture according to some embodiments of the present disclosure.

FIG. 6 is an example system 10 according to the principles of the disclosure where the system 10 constitutes three granularity levels of inconsistency detection. The functionality of each component is first described, then an example use case is provided to aid understanding.

The system 10 (also referred to as the caught-in-translation (CiT) system) includes one or more of the following components/functions that may be implemented by detection node(s) 14 such as via processing circuitry 32, and may be included as part of detection unit 40 and/or ML unit 39 (for ease of understanding, detection unit 40 and ML unit 39 is not shown in FIG. 6):

1. CiT Controller 42 that is provided by, for example, processing circuitry 32: receives inputs (logs and TOSCA description of NS) from the NFV stack and sends detection results back to the Tenant.

2. Log Processor 44 that is provided by, for example, processing circuitry 32: gathers raw logs from different NFV services and extracts event sequences and TOSCA template parameters. The input information is services logs from one or more of Level 1 (L1): Service Orchestration, Level 2 (L2): Resource Management, and Level 3 (L3): Virtualization. The system collects information using REST API.

3. Transformer-based Translation 46 Module (i.e., Deep Learning-based Translation Module) that is provided by, for example, processing circuitry 32 and/or ML unit 39: the stat-of-the-art attention-based neural machine translation application, the Transformer model, takes pairwise events sequences from L1 and lower levels as training data, e.g., Tacker events sequences from L1 and Heat events sequences from L2 are semantically related sequences. Once the model is trained, lower level events sequences are input to translate them to higher level event sequences, vice versa.

4. Neural Network-based Cross-level Embedding Model (e.g., Siamese Network 48) that is provided by, for example, processing circuitry 32 and/or detection unit 40: the implementation of this model is based on Siamese architecture, which is shown on the right of the FIG. 6. The original events sequences, in one case is L1 events sequences, and the translated events sequences may be inputted to this model. It first generates the basic encoding for both sequences then a similarity score may be calculated based on the encoded sequences.

5. Event Sequence Similarity Comparison that is provided by, for example, processing circuitry 32 and/or detection unit 40: this component takes per events sequence pairs and detects discrepancies on events sequence level, which is the first level of the inconsistency detection.

6. Workflow Similarity Comparison that is provided by, for example, processing circuitry 32 and/or detection unit 40: this component takes a series of events sequences as input(s) and detects inconsistencies on the workflow level, which is the second level of the inconsistency detection.

7. Diff-based TOSCA verifier (also referred to as rule-based TOSCA verifier 50) that is provided by, for example, processing circuitry 32 and/or detection unit 40: this module first takes the input from services logs then translate the log parameters back to TOSCA template. Then a rule-based TOSCA verifier 50 may take the translated TOSCA template and end user deployed TOSCA template as input to verify the correctness of the deployment. This is the third level of the inconsistency detection.

Figure 7:
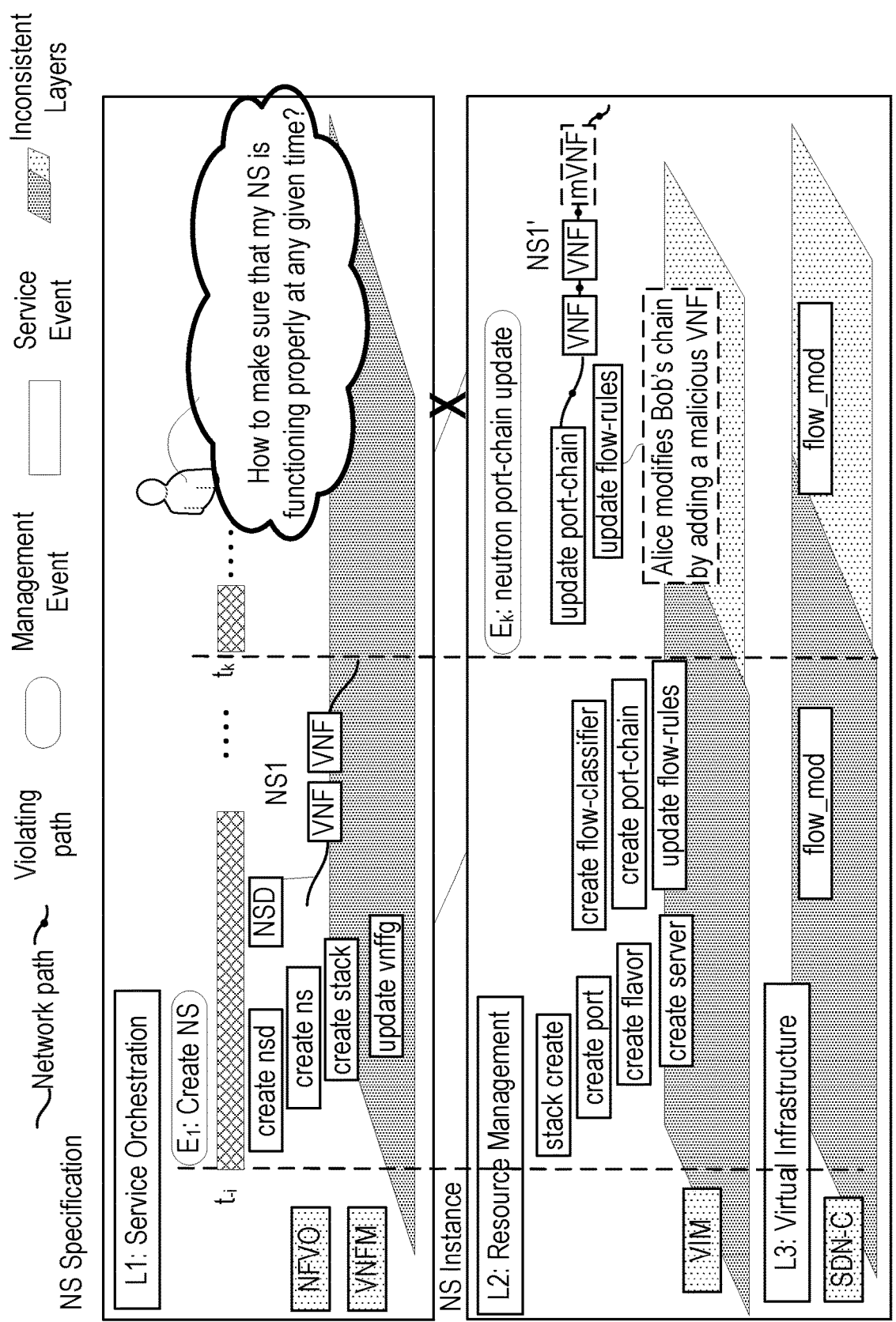
FIG. 7 is a diagram of a use case for the system according to some embodiments of the present disclosure.

FIG. 7 is a diagram illustrating an example and non-limiting use case for system 10. Bob is an NFV client from L1 and Alice is a cloud tenant from L2. In or at $t_{-i}$, user Bob created an NS, NS1, with two VNFs. Then in/at $t_k$, Alice exploits a vulnerability (OSSA-2017-004) in VIM level and maliciously inserts her mVNF to Bob's NS1. Since Alice only performs her operations in VIM level (L2), the entire malicious changes are not reflected to Bob at L1. Thus, existing systems may be unable to detect any inconsistency when the lower level implementation details are missing.

In one or more embodiments, the system 10 described herein translates lower level events back to higher level for end users to perform inconsistency detection and ensure the correctness of their deployments. The translated results reflect the implementation details in lower level. Thus, those results could be used to compare with the original events sequences to detect discrepancies in various granularity levels. Once the system 10 is run with the inputs from FIG. 7, an extra event sequence may be found in the translated events sequences (corresponding to insert mVNF to NS1 by Alice) then the inconsistency would be detected by Bob.

The Component and Workflow of System 10

Each component of system 10 presented below and then the workflow of the system is presented.

The components of system 10 may include one or more of:

CiT Controller 42

Figure 8:
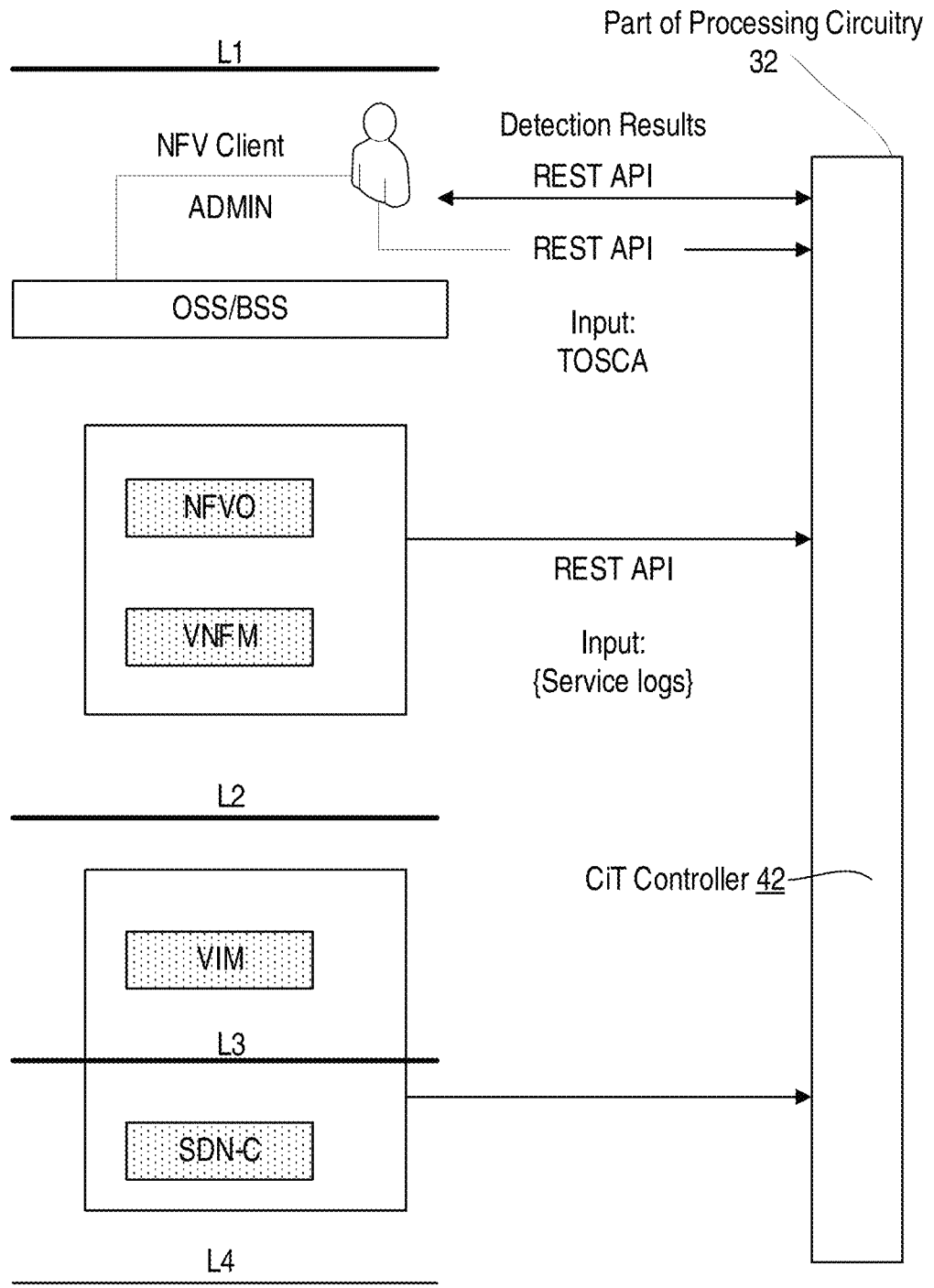
FIG. 8 is a diagram of a CiT controller according to some embodiments of the present disclosure.

The CiT controller 42 is the management component between the NFV managerial components and the system, and is shown in FIG. 8. The CiT controller 42 may be implemented by one or more of processing circuitry 32, processor 34, communication interface 30, detection unit 40, ML unit 39, etc. The communication between the NFV managerial components and the controller could be implemented as REST API. The functionality of this component is as follows:

1. Gather service logs from different services, e.g., Tacker/Heat/Neutron/Nova/SFC services in OpenStack implementation.

2. Gather TOSCA template as an input for TOSCA verifier from end users.

3. Pass service logs to log processor 44.

4. Collect detection results from the different components and send the results back to end users.

Log Processor 44 that May Part of Processing Circuitry 32

The functionality of log processor 44 is to accept services logs from the CiT controller 42 and extract parameters to translate back to TOSCA template and extract events sequences.

In natural language process (NLP), if a trained model needs to convert words that never appear during training, the words are referred to as out-of-vocabulary (OOV). This is a well-known problem in NLP, and the problem faced in one or more examples herein is one of user IDs, tenant IDs, resource IDs, resource requirements parameters, labels, timestamps are changing all the time.

Figure 10:
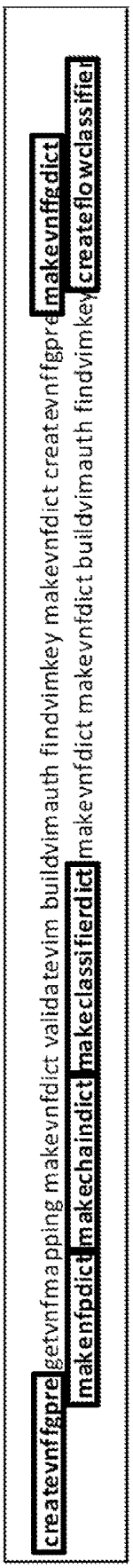
FIG. 10 is an example of extracted event sequences from FIG. 9 according to some embodiments of the present disclosure.

To address this challenge, the log processor 44 may only extract event sequences by eliminating the instance specific information and using type event instead, in order to capture the sequences of NFV service event types. The log processor 44 can be modified to group event sequences based on timestamps (i.e., event sequences for each day), or a specific operation (i.e., event sequences with the same request id). FIG. 9 is a diagram of an example of how events are extracted from the raw service log entries where raw log from tacker service from OpenStack implementation is shown. FIG. 10 is a diagram of extracted event sequences based on Tenant ID, Resource ID, Resource ID and timestamp. The events sequences that are extracted by log processor 44 from services logs are the direct inputs to the transformer based translation module and neural-network based cross-level embedding module where module may be trained based on those events sequences.

The system-initiated events (e.g., _create_vnffg_pre, make_vnffg_dict, etc.) to the event sequences in addition to the user events (e.g., Create VNFFG) may be included for two reasons. First, inconsistencies may occur due to system misconfiguration, such as a version mismatch between two independent NFV services may result in silent failures (e.g., failing to update flow rules). Second, collecting more system-initiated events provides better granularity which increases the accuracy of inconsistency detection.

Transformer-Based Translation 46 Module that May Part of Processing Circuitry 32 and/or ML Unit 39

The transformer-based translation 46 module is configured to translate events sequences from one level to another level. In occurrence, different management operations performed by NFV MANO from low levels, i.e., VIM MANO OpenStack level, into higher level operations, i.e., NFVO MANO Tacker, may be used. The transformer-based translation 46 module first trains neural networks based on pairwise input and output events sequence. Once the model is trained, the transformer-based translation module takes input events sequences from one level and translates them to another level.

Figure 11:
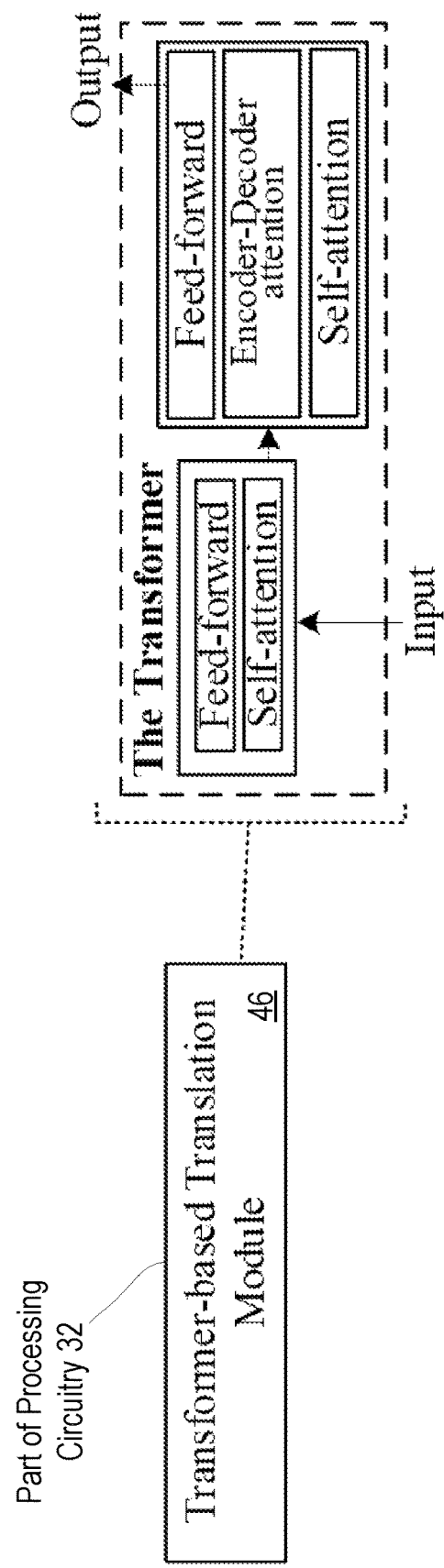
FIG. 11 is a diagram of a transformer-based translation module according to some embodiments of the present disclosure.

FIG. 11 is a block diagram of the transformer-based translation 46 module. As illustrated on the right side of FIG. 11, Sequence-to-Sequence (Seq2Seq) is an encoder-decoder based neural network model which is primarily used for machine translation, i.e., to convert sequences from one domain (e.g., sentences in English) to sequences of another domain (e.g., to sentences in German). The similarities between language translation and NFV cross-level events translation can be observed, and the Transformer, a neural network model, that uses an attention mechanism to boost the performance of Seq2Seq translation model is utilized.

Example 2

Figure 12:
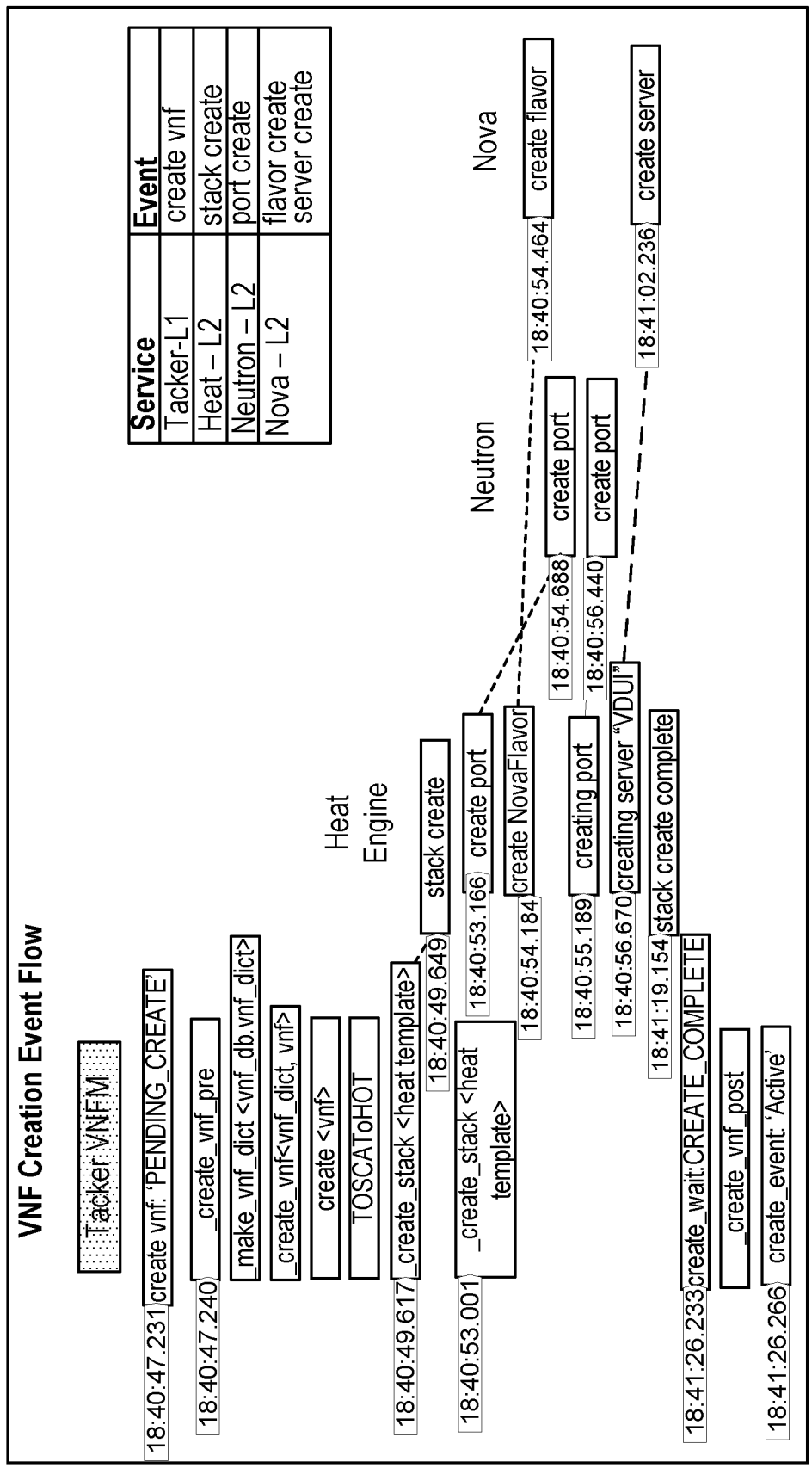
FIG. 12 is a diagram of VNF create event flow according to some embodiments of the present disclosure.

In another example of the Transformer model, a VNF creation event flow is shown in FIG. 12. The creation passes events from Tacker to Heat, then to Neutron and Nova services. The Transformer model takes pairwise events sequences as inputs, e.g., the events sequences listed in Tacker VNFM level and Heat Engine Level. Then once the model is trained, the Heat Engine event sequences are input and the model outputs Tacker VNFM level events, vice versa.

An example of Heat events sequence and Tacker events sequence (pairwise input) is illustrated as follows:

Heat: creatingstack validatingnovaflavor validatingport validatingserver creatingport creatingnovaflavor creatingserver Tacker: makevnfdict makevnfdict makevnfdict parsetemplateinput buildvimauth findvimkey createvnfpre makevnfdict createvnf getvnfd createstack createstack createstack makevnfdict findmgmtips createvnfpost Neural Network-Based Cross-Level Embedding Model (e.g., Siamese Network 48) that May Implemented and/or Part of Processing Circuitry 32 and/or Detection Unit 40

Figure 13:
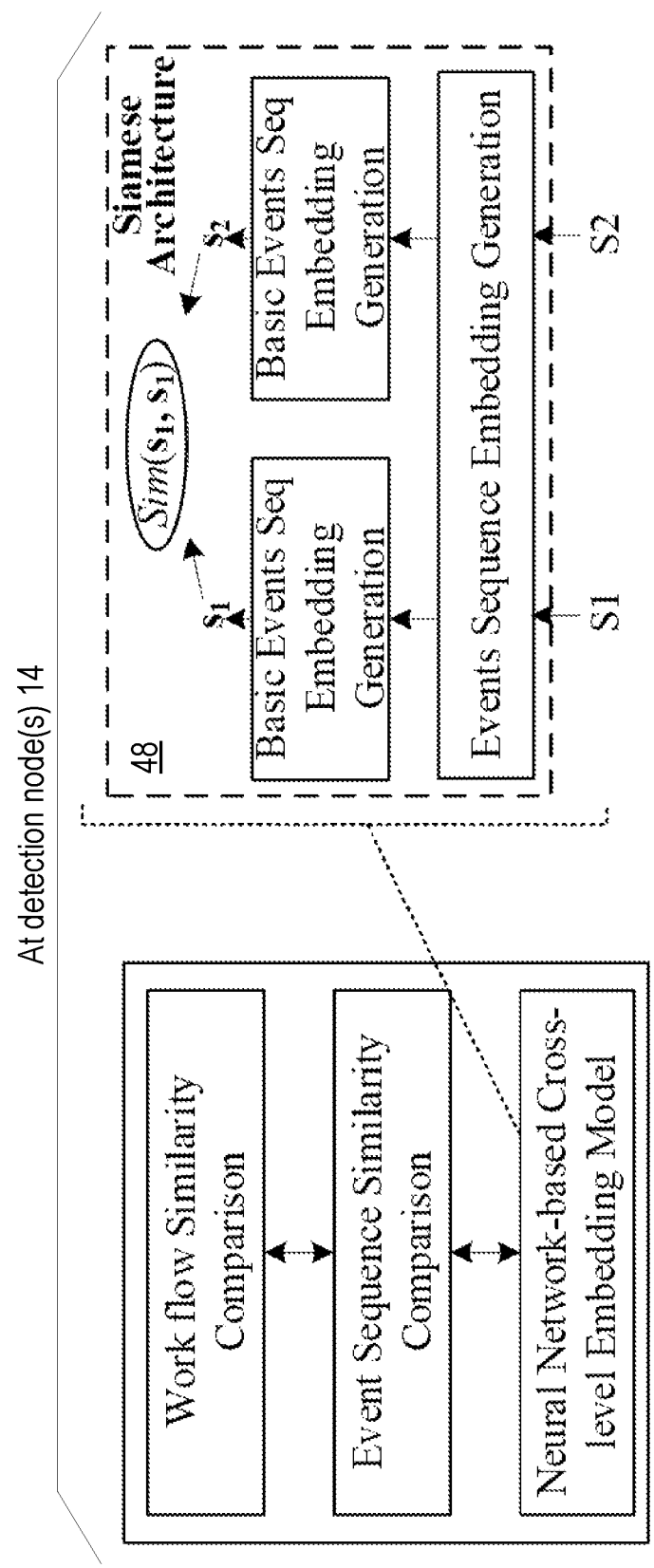
FIG. 13 is a diagram of the neural network-based cross-level embedding module according to some embodiments of the present disclosure.

The Neural Network-based Cross-level Embedding Model applies Siamese Architecture, which is shown on the right side of FIG. 13, and the model provides two levels of similarity comparison, namely, workflow similarity comparison and event sequence similarity comparison. In model training process, pairwise inputs with similarity score from the same level are fed/input to the recurrent neural network model.

Example 3

In the training dataset generation, two events sequences are selected from one level, e.g., Tacker level, and a similarity score is assigned to the selected events sequences. If both events sequences belong to the same operation, such as, a create VNF operation, a 1 value is the similarity score that is assigned, otherwise a 0 value is assigned. For example, the following two events sequences both belong to create VNF, in the training dataset, where a similarity score of 1 is assigned to this pair of input.

Tacker Events Sequences 1:
makevnfdict makevnfdict makevnfdict parsetemplateinput buildvimauth findvimkey createvnfpre makevnfdict makevnfdict makevnfdict createvnf getvnfd createstack createstack createstack makevnfdict findmgmtips createvnfpost->Label: Create VNF Tacker Events Sequences 2:
makevnfdict parsetemplateinput buildvimauth findvimkey createvnfpre makevnfdict createvnf getvnfd createstack createstack createstack makevnfdict findmgmtips createvnfpost->Label: Create VNF Once the model is trained, the trained model may be used to detect inconsistency in two different granularity levels. In Example 4, the VNF inserted by Alice is not operated by Bob from level 1, thus once the translation from level 2 to level 1 is finished, the trained model may detect a discrepancy between the events sequences performed by Bob and the translated events sequences. FIG. 14 is a diagram of sample translation results from the Transformer (e.g., Transformer-based Translation 46).

Example 4

Figure 15:
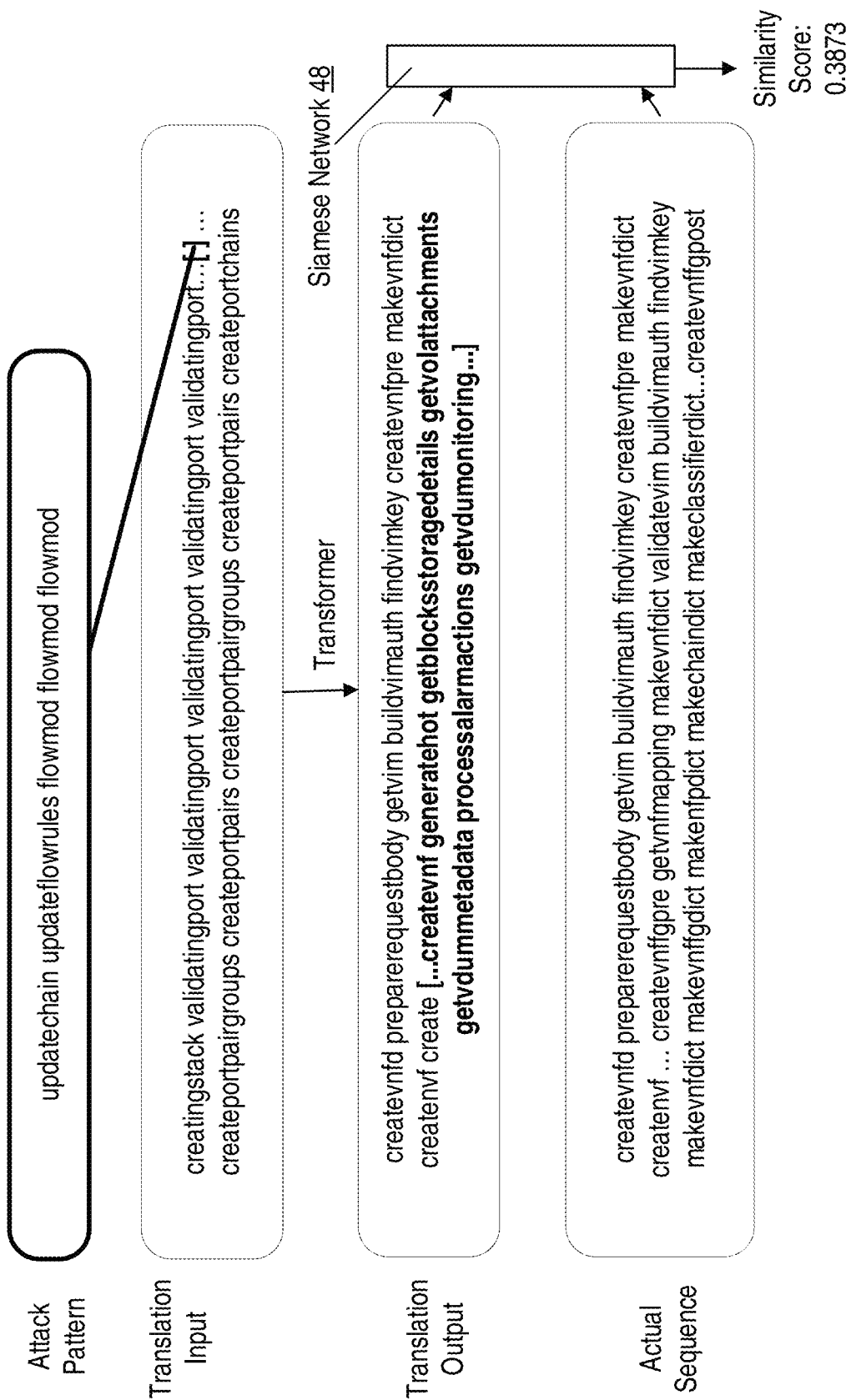
FIG. 15 is a diagram of inconsistency detection workflow according to some embodiments of the present disclosure.

The workflow for the event-sequence translation and the inconsistency detection using the Siamese network 48 as described herein is shown in FIG. 15 for Example 4.

The attack pattern box shows an attack pattern which is injected in the event sequence which is then translated using the Transformer. Since, the Transformer has not seen the attack pattern before, the transformer may output an event sequence with randomly predicted events (as indicated in bold in the Translation Output). For detection, the translated output sequence is compared with the actual event sequence from L1. The calculated similarity score given by the Siamese network 48 is 0.3873 which is less than the predefined threshold.

Diff-Based TOSCA Verifier 50 that May be Implemented by and/or Part of Processing Circuitry 32

Figure 16:
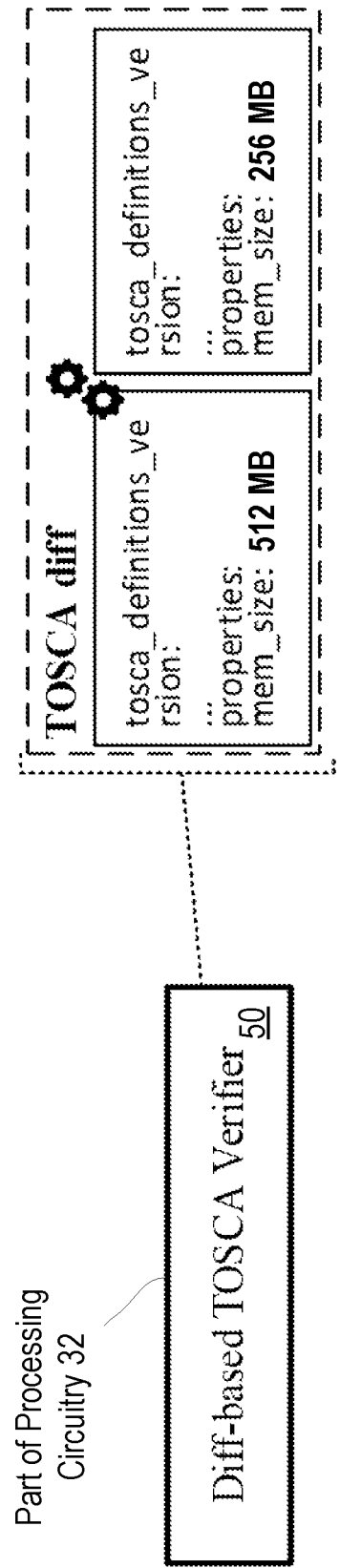
FIG. 16 is a diagram of a rule-based TOSCA verifier according to some embodiments of the present disclosure.

This component accepts two inputs, which are the original TOSCA template from end user and the translated TOSCA template that reflects the real implementation in the lower level, and generates the difference between those two inputs. Since the TOSCA template is well structured YAML file, a rule-based verification between both inputs may be used. This component provides the third granularity of the inconsistency verification, i.e., the event sequences and workflow are both correct but the requirements from end users are not properly implemented in the lower level. The right portion of FIG. 16 illustrates the discrepancy between the memory size of requested VNF, i.e., end users request 512 MB and only 256 MB is assigned in the implementation level.

An example of the TOSCA template translator algorithm is provided below:

| Algorithm 1: TOSCA Template Translator |
| --- |
| Input: Services Legs, Tenant_ID, TOSCA Template.Default |
| Output: TOSCA Template.Translated |
| 1  for log in Services Logs do |
| 2    Tenant_ID.logs = get(Services Logs, Tenant_ID) |
| 3    for log in Tenant_ID.logs do |
| 4      parameter.value, resource = get(log) |
| 5      search resource in TOSCA Template.Default |
| 6      add parameter.value to TOSCA Template.resource |
| 7  return TOSCA Template.Translated |

Figure 17:
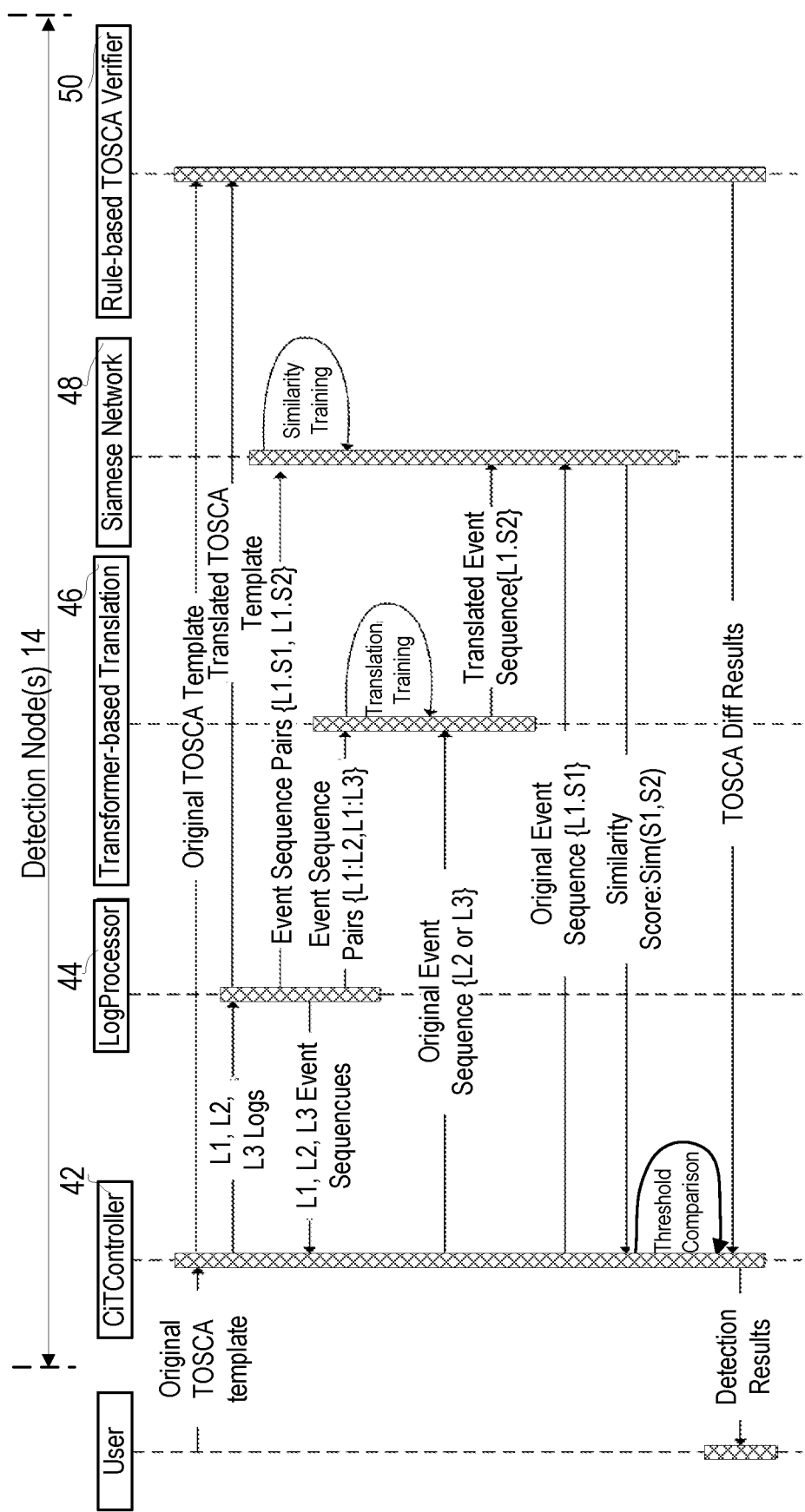
FIG. 17 is a sequence diagram for the system according to some embodiments of the present disclosure.

FIG. 17 is a workflow/sequence diagram for the system 10. The sequence diagram illustrates the relationship between different components that are described in detail above.

Accordingly, in one or more embodiments, a system 10 is provided to detect inconsistency in an NFV environment, which may be caused by a 'split-brain' problem.

In one or more embodiments, a method to transform the NFV low level implementation event sequences into some higher-level representation is provided where the higher level representation can then be compared to the initial configuration for NFV service to detect inconsistencies.

Some aspect of the teachings described herein are listed below:

1. Extracting pairwise sequences between two sequential levels of NFV service level. These event sequences between different levels are not based on instances but based on types of the event.

2. One or more embodiments use NLP methods to translate the virtual low-level service event types in NFV MANO into higher level types of representation in NFV MANO. For example, the NFV service level operations, e.g., createstack, createserver at NFV VIM level are translated into higher level service operations, e.g., createvnfd. This translation is performed by, for example, GOOGLE Transformer NLP approach. The use of ML, more precisely NLP to translate virtual low-level NFV service event sequences into higher level NFV MANO sequence events is not described nor implemented in known existing systems.

3. Similarities are extracted between NFV events using Recursive Neural Networks (RNN) approach. The system then uses RNN to measure the similarity between translated and wanted implementation to detect deviation from consistent NFV MANO instantiation using this similarity method.

4. A multi-layer comparison system is build using event sequence similarity comparison, workflow similarity comparison and a rule-based TOSCA verifier 50. This multi-layer comparison system then detects the inconsistencies at run-time. More specifically, events sequences level detects the inconsistency created by misconfigurations and/or attacks from the lower level, such that workflow level inconsistency detection may capture the abnormal operation patterns from end users, and rule-based TOSCA verifier ensure the proper implementation of end users' requirements.

The out-of-vocabulary (OOV) problem is addressed by, for example, using a NFV specific log processor 44 that targets to extract event sequences from various NFV implementation services One or more advantages of the teachings described herein are as follows:

One or more embodiments described herein define and enable a possible way for users to detect inconsistencies in their multilevel NFV deployment (e.g., whether the request from a tenant is properly deployed).

One or more embodiments described herein help ensure the correctness of a tenant network services deployment.

One or more embodiments described herein may require only the service logs as an input, which are easily accessible by regular monitoring tools, e.g., SIEM.

One or more embodiments described herein uses pairwise sequences to train an NLP model to translate events sequences between the multiple levels of an NFV stack. This is performed, for example, by the state-of-the-art machine learning model referred to as the Transformer.

One or more embodiments described herein enable the machine learning model to be applied on NFV context, which at least helps solves the challenges related to applying NLP translation into NFV context for security purpose.

One or more embodiments described herein provides three levels of inconsistencies detection, which covers a wide range of detection.

One or more embodiments described herein provides translation of events sequences which may also solve the privacy and trust issues between levels that are possibly being operated by various vendors in an NFV environment.

EXAMPLES

Example A1. A system 10 configured to:

translate Network Functions Virtualization, NFV, event sequences across different levels of a NFV stack;

use the translated NFV event sequences in machine learning, ML, based inconsistency detection to detect inconsistencies; and optionally trigger an alert based at least on one of the translation and the ML based inconsistency detection.

Example A2. The system 10 of Example A1, wherein the translation includes translating NFV event sequences from a first level to operational events at a second level, the second level being different from the first level.

Example A3. The system 10 of any one of Examples A1-A2, wherein the translation is a deep learning-based translation; and the triggering of the alert is based on at least one translation and one NFV event sequence to be verified.

Example A4. The system 10 of any one of Examples A1-A3, wherein the translation is performed by a deep learning based translation module to learn pairwise NFV event sequences; and the detection of inconsistencies is performed by a neural network-based inconsistency detection module.

Example A5. The system 10 of Example A4, wherein the neural network is a Siamese neural network.

Example A6. The system 10 of any one of Examples A1-A5, wherein the detection of inconsistences further includes calculating a similarity score based at least on at least one of the NFV event sequences and at least one of the translated NFV event sequences; and the triggering of the alert being based on the calculated similarity score.

Example A7. The system 10 of any one of Examples A1, wherein the system 10 is further configured to search for inconsistencies in the translation among corresponding NFV event sequences, at the different levels, that are associated with a requested operation; and the trigger being based at least on the search.

Example B1. A method implemented in a system, the method comprising:

translating Network Functions Virtualization, NFV, event sequences across different levels of a NFV stack;

using the translated NFV event sequences in machine learning, ML, based inconsistency detection to detect inconsistencies; and optionally triggering an alert based at least on one of the translation and the ML based inconsistency detection.

Example B2. The method of Example B1, wherein the translation includes translating NFV event sequences from a first level to operational events at a second level, the second level being different from the first level.

Example B3. The method of any one of Examples B1-B2, wherein the translation is a deep learning-based translation; and the triggering of the alert is based on at least one translation and one NFV event sequence to be verified.

Example B4. The method of any one of Examples B1-B3, wherein the translation is performed by a deep learning based translation module to learn pairwise NFV event sequences; and the detection of inconsistencies is performed by a neural network-based inconsistency detection module.

Example B5. The method of Example B4, wherein the neural network is a Siamese neural network.

Example B6. The method of any one of Examples B1-B5, wherein the detection of inconsistences further includes calculating a similarity score based at least on at least one of the NFV event sequences and at least one of the translated NFV event sequences; and the triggering of the alert being based on the calculated similarity score.

Example B7. The method of any one of Examples B1, further comprising searching for inconsistencies in the translation among corresponding NFV event sequences, at the different levels, that are associated with a requested operation; and the trigger being based at least on the search.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| Heat | Heat is a main project in the OpenStack Orchestration program |
| Neutron | Neutron is an OpenStack project to provide "network as a service" between interface devices (e.g., vNICs) managed by other OpenStack services (e.g., nova) |
| NFV | Network Functions Virtualization |
| NFVO | Network Functions Virtualization Orchestrator |
| Nova | Nova is the OpenStack project that provides a way to provision compute instances, i.e., virtual servers |
| NS | Network Service |
| SFC | Service Function Chains |
| Tacker | Tacker is an OpenStack project building a VNFM and NFVO to deploy and operate Network Services and VNFs on an NFV infrastructure platform like OpenStack; |
| TOSCA | Topology and Orchestration Specification for Cloud Applications |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A detection node in communication with a network function virtualization (NFV) system operating a NFV stack that is logically separable into a plurality of levels including a first level and a second level, the detection node comprising:
    processing circuitry configured to:
        translate an executed first level event sequence to at least one translated second level event sequence;
        compare the at least one translated second level event sequence to an executed second level event sequence to at least in part detect inconsistencies between the at least one translated second level event sequence and the executed second level event sequence, the executed second level event sequence and the executed first level event sequence being part of a multi-level sequence flow, the comparing including determining a similarity score and quantifying inconsistencies between the at least one translated second level event sequence to the executed second level event sequence; and
        trigger an alert if the similarity score meets a predefined criterion.

2. The detection node of claim 1, wherein the at least one translated second level event sequence corresponds to a plurality of translated second level event sequences that are different from each other.

3. The detection node of claim 1, wherein the translation of the executed first level event sequence to the at least one translated second level event sequence is based on a trained machine learning model.

4. The detection node of claim 3, wherein the machine learning model is trained to using different event sequences from a same level;
    a first subset of the different event sequences representing a same resulting operation; and
    a second subset of the different event sequences representing different resulting operations.

5. The detection node of claim 3, wherein the machine learning model is trained to learn different versions of event sequences that represent a same resulting operation.

6. The detection node of claim 3, wherein the machine learning model is trained to consider uncertainty between different event sequences that represent a same resulting operation.

7. The detection node of claim 1, wherein the comparing includes determining whether there are differences between a Topology and Orchestration Specification for Cloud Applications (TOSCA) template associated with an end user and a TOSCA template associated with the translated second level event sequence.

8. The detection node of claim 1, wherein the processing circuitry is further configured to:
    receive at least one service log associated with services performed by the NFV stack;
    extract parameters from the at least one service log; and
    extract the executed first level event sequence based at least on the extracted parameters.

9. The detection node of claim 1, wherein the executed first level event sequence includes at least one system-initiated event and at least one user event.

10. The detection node of claim 1, wherein each translated second level event sequence corresponds to a different implementation of the executed first level event sequence.

11. The detection node of claim 1, wherein the plurality of levels are a plurality of virtualization levels for the NFV stack.

12. The detection node of claim 11, wherein the plurality of levels includes at least two of a service orchestration level, resource management level, virtual infrastructure level and a physical infrastructure level.

13. A method implemented by a detection node in communication with a network function virtualization (NFV) system operating a NFV stack that is logically separable into a plurality of levels including a first level and a second level, the method comprising:
    translating an executed first level event sequence to at least one translated second level event sequence;
    comparing the at least one translated second level event sequence to an executed second level event sequence to at least in part detect inconsistencies between the at least one translated second level event sequence and the executed second level event sequence, the executed second level event sequence and the executed first level event sequence being part of a multi-level sequence flow, the comparing includes determining a similarity score and quantifying inconsistencies between the at least one translated second level event sequence to the executed second level event sequence; and
    triggering an alert if the similarity score meets a predefined criterion.

14. The method of claim 13, wherein the at least one translated second level event sequence corresponds to a plurality of translated second level event sequences that are different from each other.

15. The method of claim 13, wherein the translation of the executed first level event sequence to the at least one translated second level event sequence is based on a trained machine learning model.

16. The method of claim 15, wherein the machine learning model is trained to using different event sequences from a same level;
    a first subset of the different event sequences representing a same resulting operation; and
    a second subset of the different event sequences representing different resulting operations.

17. The method of claim 15, wherein the machine learning model is trained to learn different versions of event sequences that represent a same resulting operation.

18. The method of claim 15, wherein the machine learning model is trained to consider uncertainty between different event sequences that represent a same resulting operation.

19. The method of claim 13, wherein the comparing includes determining whether there are differences between a Topology and Orchestration Specification for Cloud Applications (TOSCA) template associated with an end user and a TOSCA template associated with the translated second level event sequence.

20. The method of claim 13, further comprising:
receiving at least one service log associated with services performed by the NFV stack;
extracting parameters from the at least one service log; and
extracting the executed first level event sequence based at least on the extracted parameters.

21. The method of claim 13, wherein the executed first level event sequence includes at least one system-initiated event and at least one user event.

22. The method of claim 13, wherein each translated second level event sequence corresponds to a different implementation of the executed first level event sequence.

23. The method of claim 13, wherein the plurality of levels are a plurality of virtualization levels for the NFV stack.

24. The method of claim 23, wherein the plurality of levels includes at least two of a service orchestration level, resource management level, virtual infrastructure level and a physical infrastructure level.

25. A non-transitory computer readable medium including processing instructions, which when executed by a processor, cause the processor to:

translate an executed first level event sequence to at least one translated second level event sequence, the first level event sequence and second level event sequence being part of a network function virtualization (NFV) stack that is logically separable into a plurality of levels;

compare the at least one translated second level event sequence to an executed second level event sequence to at least in part detect inconsistencies between the at least one translated second level event sequence and the executed second level event sequence, the executed second level event sequence and the executed first level event sequence being part of a multi-level sequence flow, the comparing including determining a similarity score and quantifying inconsistencies between the at least one translated second level event sequence to the executed second level event sequence; and trigger an alert if the similarity score meets a predefined criterion.

* * * * *